(No Model.)
J. NELSON.
CROSSING FOR ELECTRIC RAILWAYS.
No. 504,276. Patented Aug. 29, 1893.
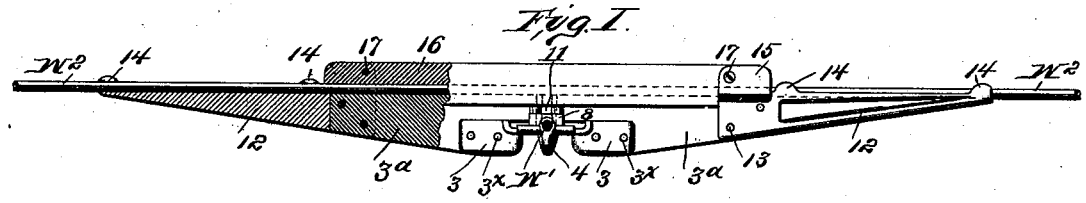

UNITED STATES PATENT OFFICE.

JAY NELSON, OF ST. LOUIS, MISSOURI, ASSIGNOR OF ONE-HALF TO THOMAS C. WHITE, OF SAME PLACE.

CROSSING FOR ELECTRIC RAILWAYS.

SPECIFICATION forming part of Letters Patent No. 504,276, dated August 29, 1893.

Application filed May 18, 1893. Serial No. 474,711. (No model.)

*To all whom it may concern:*

Be it known that I, JAY NELSON, a citizen of the United States, residing at St. Louis, in the State of Missouri, have invented a new and useful Insulating Trolley-Crossing for Electric Railways, of which the following is a specification.

The objects of my invention are to provide a light and strong trolley crossing for electric railways, which can be readily applied to cross wires without severing either of them and will effectually prevent electrical connection between them. To this end I construct my crossing with a central cruciform plate or body of metal, in which the lower wire is seated and secured by the aid of clips and projecting ears, and to which are attached bars of insulating material, carrying separate ears for attachment of the upper wire, and formed and arranged to securely insulate the same from the lower wire.

In the accompanying drawings, forming part of this specification:—Figure I is an elevation, partly in section, in line with the upper wire. Fig. II is a top view of the device. Fig. III is an elevation on a large scale, showing the central body in section, on the line of the lower wire, and one of the main supporting ears being omitted. Fig. IV is a top view of the same. Fig. V is a top view of one of the side ears detached. Fig. VI is a detail, perspective view of the central part of the device, illustrating the mode of introducing the lower wire.

$W'$ represents the lower wire, and $W^2$ the upper cross wire, to which wires my insulating trolley crossing is to be applied, without severing either of said wires.

The central plate 1 of the device is formed of phosphor bronze or other suitable metal, with longitudinal arms 2, 2, and transverse arms 3, 3.

To the longitudinal arms 2, 2, are secured bars 4, 4, one of which is shown in elevation, and in plan, in the large scale views, Figs. III and IV. For the reception of the said ears, each of the arms 2 is provided with a slot 5, through which the heel of the ear 4 is inserted endwise, from below, the said heel being formed to fill the slot and having a lug 6, projecting from its extremity, which catches over the center plate 1, and firmly secures the arm 2, thereto, when the said arm is turned up into horizontal position, as shown in Fig. III. The arms 2, 2, are provided with seats 7, 7, for the lower wire $W'$, in which it is held by cap plates 8, 8, secured by screws 9, 9. The ears 4, 4, are grooved on the upper edge to receive the wire $W'$, and provided with lips 10 which are closed over the said wire to secure it. The ears 4 are formed of bronze or other suitable metal, sufficiently ductile for the purpose. The said ears are formed on the under side with ways 8, and an intervening bridge projection 9 to conduct the trolley under the crossing in line with the lower wire.

For the purpose of seating the upper wire $W^2$ and insulating it from the lower wire, I attach to the bifurcated ends of the transverse arms 3, 3, by the aid of rivets $3^x$, extension arms $3^a, 3^a$, of wood fiber or other insulating material, grooved to receive said upper wire and separated at the center to a sufficient distance to permit the passage of the lower wire $W'$ between them in placing the device in position, after which the space is closed by a sliding key 11, of insulating material, the top of which is grooved to correspond with the top of the transverse insulating arms $3^a$ forming a continuous groove to receive the upper wire, and hold it at a sufficient distance from the lower wire, say one and one-fourth inches; more or less, so as to prevent the possibility of electric contact or transmission between them. To the extremities of the insulating arms $2^a$ are secured by screws or rivets 13, lateral metallic ears 12 grooved on their upper edge in line with the top of the insulating arms $3^a$, so as to receive the wire. The transverse metallic ears 12 are also provided with lips 14, 14, which are bent down over the wire $W^2$ to secure it, and their heels are formed with upwardly projecting lugs 15, which receive between them a grooved cap bar 16 of insulating material fitting over the wire $W^2$ on top of the arms $3^a$, and secured by screws 17.

From the above description it will be understood that the application of my device to intersecting trolley wires is easy and simple. The cap bar 16 and key 11, and cap plates 18 being removed and the lugs 10 open, the lower wire W' is placed in its seats 7, and there secured by the caps 8, and is held in the top groove of the ears 4 by turning down over it the clips 10, as shown. This position is shown in Fig. VI. The key 11 is then slipped in place, completing the insulating seat for the upper wire W². This wire is then placed in position and covered by the cap bar 16, which is slipped between the lugs 15 of the side ears 12, and there secured by screws 17. The upper wire is further confined by turning down the lips 14. In practice I prefer to solder the wires W', W² to the ears 4 and 12 respectively.

Having thus described my invention, the following is what I claim as new therein and desire to secure by Letters Patent:

1. An insulating trolley crossing for intersecting electric wires constructed substantially as herein described with a seat for the lower wire, an insulating seat for the upper wire, slotted for the passage of the lower wire, and means for confining the upper wire in its seat.

2. The combination of the cruciform center piece 1, having arms 2 for seating and securing the lower wire, the transverse insulating arms 3ª for seating the upper wire, having a central slot or space between them, the key 11 for closing said slot and means for confining the upper wire in the seat thus provided, substantially as described.

3. The combination of the cruciform center plate, 1, 2, 3, and ears 4 engaging therewith at their inner ends and grooved for the reception of the wire W' as explained.

4. The combination of the cruciform center plate 1, 2, 3, grooved ears 4, transverse insulating arms 3ª and grooved transverse ears 12, substantially as and for the purpose set forth.

5. The combination of the cruciform center plate 1, 2, 3, grooved ears 4, transverse insulating arms 3ª, a key 11, grooved lateral ears 12, and cap bar 16, substantially as and for the purposes set forth.

6. An insulating trolley crossing for intersecting electric wires, constructed substantially as herein described, with a seat for the lower wire, an insulating seat for the upper wire, slotted for the passage of the lower wire, means for confining the upper wire in its seat, and the lower wire W' and the upper wire W², that are thus seated; said wires being each integral in a continuous course; substantially as described.

JAY NELSON.

In presence of—
  BENJ. A. KNIGHT,
  E. S. KNIGHT.